(12) United States Patent
Tochiki

(10) Patent No.: US 10,654,319 B2
(45) Date of Patent: May 19, 2020

(54) MOTORCYCLE TIRE

(71) Applicant: Sumitomo Rubber Industries, Ltd., Kobe-shi, Hyogo (JP)

(72) Inventor: Yuki Tochiki, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 268 days.

(21) Appl. No.: 15/688,223

(22) Filed: Aug. 28, 2017

(65) Prior Publication Data

US 2018/0056721 A1 Mar. 1, 2018

(30) Foreign Application Priority Data

Aug. 30, 2016 (JP) .................. 2016-168178

(51) Int. Cl.
*B60C 9/22* (2006.01)
*B60C 9/00* (2006.01)
(Continued)

(52) U.S. Cl.
CPC ............ *B60C 9/0042* (2013.01); *B29D 30/38* (2013.01); *B60C 9/08* (2013.01); *B60C 9/20* (2013.01); *B60C 9/22* (2013.01); *B60C 9/2204* (2013.01); *B29B 15/08* (2013.01); *B29D 2030/383* (2013.01); *B60C 11/00* (2013.01); *B60C 2009/2223* (2013.01); *B60C 2009/2252* (2013.01); *B60C 2009/2295* (2013.01); *B60C 2200/10* (2013.01)

(58) Field of Classification Search
CPC ... B60C 9/0007; B60C 9/0028; B60C 9/0042; B60C 9/005; B60C 9/0057; B60C 9/0064; B60C 2009/0014; B60C 2009/0021; B60C 2009/0035; B60C 2009/0071; B60C 2009/0078; B60C 2009/0085; B60C 2009/0092; B60C 2200/10; B60C 9/20; B60C 9/22; B60C 9/2204
See application file for complete search history.

(56) References Cited

U.S. PATENT DOCUMENTS 4,945,967 A * 8/1990 Tavazza ................ B60C 9/2009
152/527
6,425,426 B1 * 7/2002 Osborne .................. B60C 9/20
152/209.1

(Continued)

FOREIGN PATENT DOCUMENTS

EP 0 756 949 A1 2/1997
JP 9-118109 A 5/1997

*Primary Examiner* — Jodi C Franklin
*Assistant Examiner* — Alexander A Wang
(74) *Attorney, Agent, or Firm* — Birch, Stewart, Kolasch & Birch, LLP

(57) ABSTRACT

A motorcycle tire 1 comprises a tread portion 2, sidewall portions 3, bead portions 4, a carcass 6 extending between the bead portions, and a tread reinforcing layer 7 disposed radially outside the carcass in the tread portion. The tread reinforcing layer 7 is composed of a helically wound strip 10 of parallel reinforcing cords 11 coated with topping rubber 12. The winding pitch Pm of the strip 10 in middle parts Mi of the tread reinforcing layer is less than the winding pitch Pc of the strip 10 in a central part Cr, and less than the winding pitch Ps of the strip 10 in shoulder parts Sh.

9 Claims, 4 Drawing Sheets

(51) Int. Cl.
  *B29D 30/38*   (2006.01)
  *B60C 9/08*    (2006.01)
  *B60C 9/20*    (2006.01)
  *B29B 15/08*   (2006.01)
  *B60C 11/00*   (2006.01)

(56) References Cited

U.S. PATENT DOCUMENTS

| | | | |
|---|---|---|---|
| 2002/0026979 A1* | 3/2002 | Tanaka | B29D 30/3028 156/130.7 |
| 2009/0020208 A1* | 1/2009 | Fukumoto | B60C 9/0042 152/556 |
| 2011/0303339 A1* | 12/2011 | Valle | B60C 9/08 152/548 |
| 2011/0308678 A1* | 12/2011 | Bordoz | B60C 9/08 152/209.5 |

* cited by examiner

MOTORCYCLE TIRE

TECHNICAL FIELD

The present invention relates to a motorcycle tire, more particularly to a structure of a tread reinforcing layer capable of improving the handling stability and riding comfort in a well-balanced manner.

BACKGROUND ART

There has been known a motorcycle tire provided in the tread portion with a tread reinforcing layer formed by helically winding a rubber strip in which parallel reinforcing cords are embedded. The strip is wound such that the sides of axially adjacent turns of the strip abut on each other.

By providing such tread reinforcing layer, the carcass is tightly hooped and increased in the apparent rigidity over the entire width of the tread portion so that the tire is improved in the handling stability.

However, as the apparent rigidity of the carcass is increased, vibrations during running are not fully absorbed, and riding comfort is not good.

PRIOR ART DOCUMENT

Patent Document 1: Japanese Patent Application Publication No. JPH09-118109

SUMMARY OF THE INVENTION

In view of the circumstances described above, the present invention was made, and a primary object thereof is to provide a motorcycle tire in which, by improving a tread reinforcing layer, the handling stability and riding comfort can be improved in a well-balanced manner.

According to the present invention, a motorcycle tire comprises
a tread portion,
a pair of sidewall portions,
a pair of bead portions,
a carcass extending between the bead portions through the tread portion and the sidewall portions, and
a tread reinforcing layer disposed radially outside the carcass in the tread portion, wherein
the tread reinforcing layer is composed of a helically wound strip of parallel reinforcing cords coated with topping rubber, and
the winding pitch of the wound strip is larger in a central part and axially outer shoulder parts of the tread reinforcing layer than in middle parts of the tread reinforcing layer between the central part and the shoulder parts.

Further, the motorcycle tire according to the present invention may include the following features (1)-(6):
(1) the winding pitch is larger in the central part than in the axially outer shoulder parts;
(2) a pitch ratio P/La of the winding pitch P of the strip to a distance La between the reinforcing cords in the strip which are closest to the respective two sides of the strip is 162% to 260% in the central part, 129% to 162% in the middle parts, and 140% to 240% in the shoulder parts;
(3) the width of the central part measured along the tread face is 10% to 52% of a tread reinforcing layer width which is the width of the tread reinforcing layer measure along the tread face,
the width of each of the middle parts measured along the tread face is 17% to 38% of the tread reinforcing layer width, and
the width of each of the shoulder parts measured along the tread face is 7% to 28% of the tread reinforcing layer width;
(4) the tread reinforcing layer is composed of a first halved reinforcing layer disposed on one side of the tire equator, and a second halved reinforcing layer disposed on the other side of the tire equator,
the strip includes a first strip to form the first halved reinforcing layer, and a second strip to form the second halved reinforcing layer,
the reinforcing cords of the first strip include an axially inside first reinforcing cord and an axially outside second reinforcing cord disposed axially outside the first reinforcing cord,
the reinforcing cords of the second strip include an axially inside first reinforcing cord and an axially outside second reinforcing cord disposed axially outside the first reinforcing cord, and
in each of the first strip and the second strip, an initial elongation percentage a2 of the axially outside second reinforcing cord is greater than an initial elongation percentage a1 of the axially inside first reinforcing cord, wherein the initial elongation percentage of a reinforcing cord is an elongation of the cord in terms of a percentage when a load applied to the cord is increased from 2.5N to 49N;
(5) the initial elongation percentage a1 of the axially inside first reinforcing cord is in a range from 50% to 90% of the initial elongation percentage a2 of the axially outside second reinforcing cord;
(6) the distance La between the reinforcing cords in the strip is in a range from 2.0 to 8.2 mm.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list.

For example, the standard wheel rim is the "standard rim" specified in JATMA, the "measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like.

DESCRIPTION OF THE PREFERRED EMBODIMENTS

Embodiments of the present invention will now be described in conjunction with accompanying drawings.

The present invention can be applied to a pneumatic motorcycle tire regardless of for front wheel or rear wheel.

Figure 1:
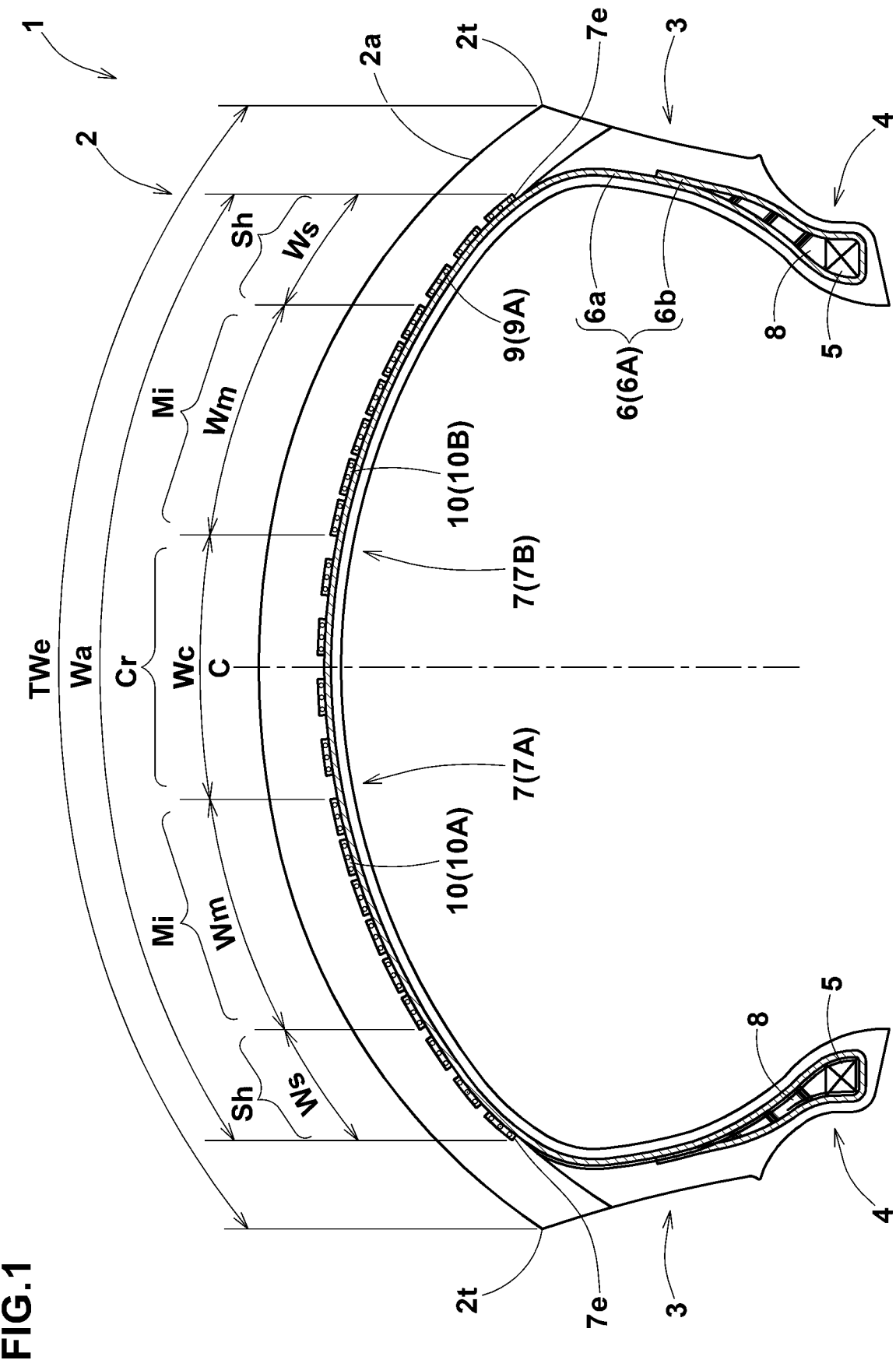
FIG. 1 is a cross-sectional view of a motorcycle tire as an embodiment of the present invention.

FIG. 1 shows a motorcycle tire 1 as an embodiment of the present invention under the normally inflated unloaded condition.

As shown, the motorcycle tire 1 is a pneumatic tire comprising a tread portion 2 whose outer surface defines the tread face 2a, a pair of axially spaced bead portions 4, a pair of sidewall portions 3 extending between the tread edges 2t and the bead portions 4, a carcass 6 extending between the bead portions 4 through the tread portion 2 and the sidewall portions 3, and a tread reinforcing layer 7 disposed radially outside the carcass 6 in the tread portion 2.

As a characteristic of a motorcycle tire, the tread portion 2 (inclusive of the carcass 6, tread reinforcement layer 7 and a tread rubber thereon) is curved with a relatively small radius of curvature when compared with the passenger car tires, truck/bus tires and the like, and the maximum cross section width of the tire lies between the tread edges 2t.

The undermentioned developed tread width Twe is a length measured between the tread edges 2t along the tread face 2a in a tire meridian section.

Incidentally, the tread portion 2 can be provided with grooves for the purpose of drainage although not shown in the drawings.

The carcass 6 is composed of at least one ply 6A (in the present embodiment, a single ply 6A) of cords extending between the bead portions 4 through the tread portion 2 and the sidewall portions 3, and turned up around a bead core 5 in each of the bead portions so as to form a pair of turnup portions 6b and a main portion 6a therebetween.

Each of the bead portions 4 is provided between the main portion 6a and turnup portion 6b with a bead apex rubber 8 made of hard rubber.

The tread reinforcing layer 7 comprises one ply of circumferentially and helically wound reinforcing cords 11. In the present embodiment, the tread reinforcing layer 7 is made up of a single ply of circumferentially and helically wound reinforcing cords 11, therefore, the tread reinforcing layer 7 is the so-called zero-degree band 9 consisting a single ply 9A. The axial ends 7e of the tread reinforcing layer 7 are positioned in the vicinities of the tread edges 2t.

Incidentally, it may be possible to use the tread reinforcing layer 7 in combination with a belt or breaker formed of reinforcing cords inclined relatively largely with respect to the tire circumferential direction. In such case, the breaker may be of cross breaker plies. In such case, the breaker may be disposed radially inside or outside the tread reinforcing layer 7. Further, it may be possible to use the tread reinforcing layer 7 in combination with another tread reinforcing layer 7, in other words, the tread reinforcing layer 7 may comprise two plies of circumferentially and helically wound reinforcing cords 11.

Figure 2:
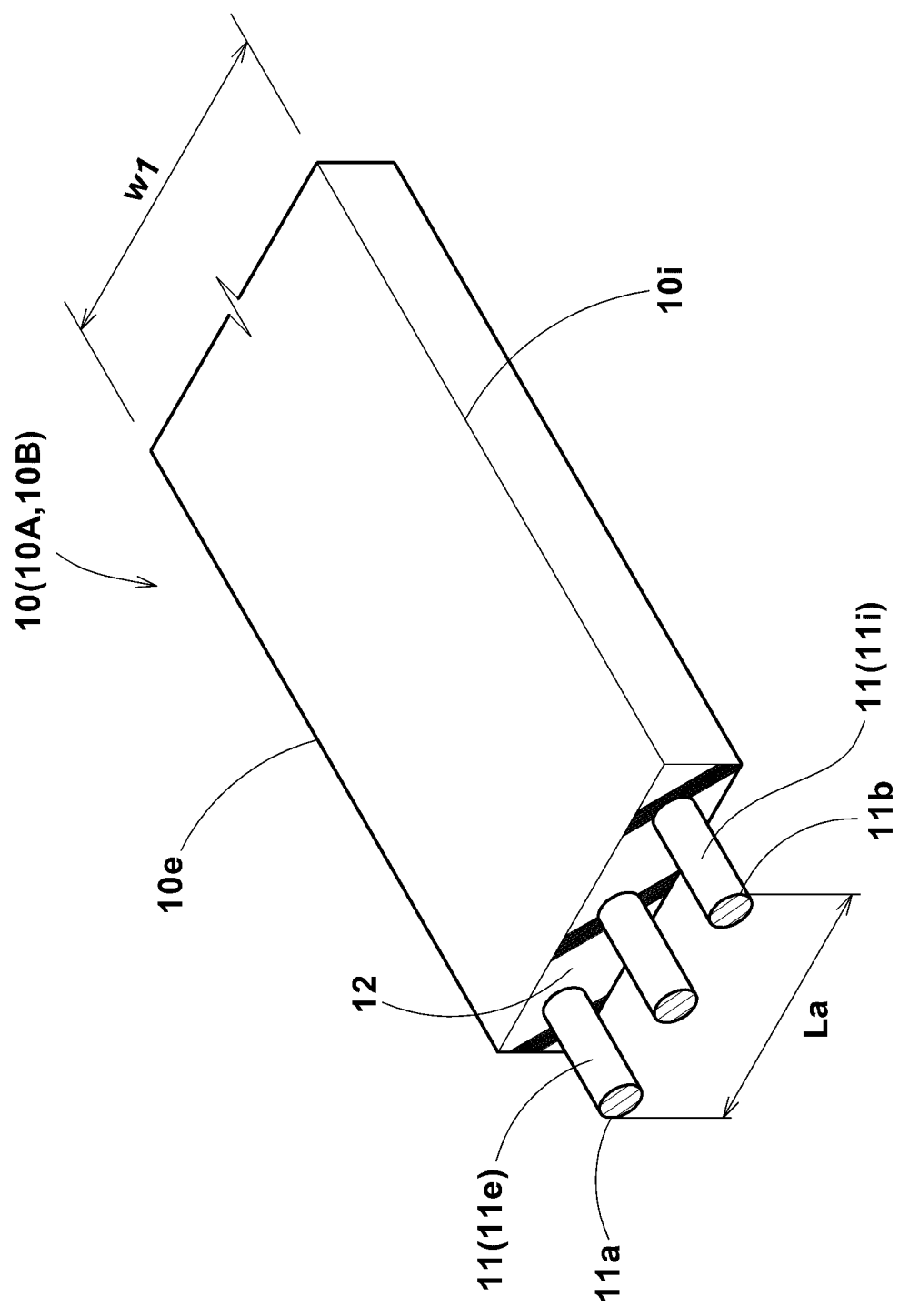
FIG. 2 is a schematic perspective partial view of an example of the strip of parallel reinforcing cords coated with topping rubber which is helically wound into the tread reinforcing layer.

The tread reinforcing layer 7 is, as shown in FIG. 2, formed by circumferentially and helically winding a strip 10 of the reinforcing cords 11 which are laid along the length of the strip in parallel with each other and coated with topping rubber 12.

Such tread reinforcing layer 7 suppress movements of the tread portion 2 during running, and helps to improve the handling stability.

Figure 3:
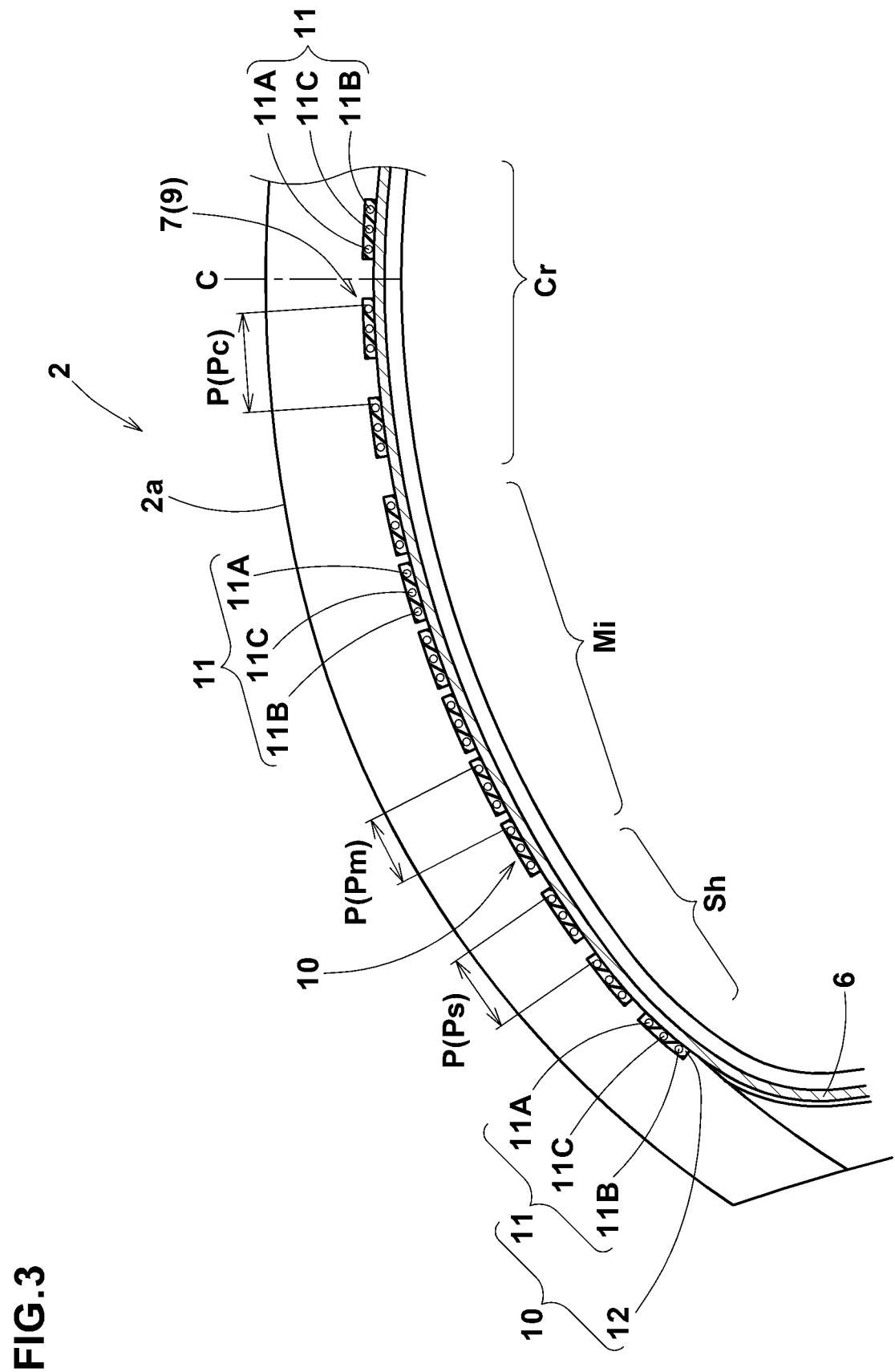
FIG. 3 is a cross sectional view of the left-hand part of the tread portion of the motorcycle tire shown in FIG. 1.

As shown in FIG. 1, when the tread reinforcing layer 7 is sectioned into a central part Cr centered on the tire equator C, a pair of axially outermost shoulder parts Sh, and a pair of middle parts Mi therebetween,
the winding pitch Pm of the strip 10 in the middle parts Mi is smaller than the winding pitch Pc of the strip 10 in the central part Cr, and smaller than the winding pitch Ps of the strip 10 in the shoulder parts Sh as shown in FIG. 3.

Accordingly, the rigidity is increased in the middle parts Mi on which large load is exerted when the motorcycle is leaned to initiate cornering or end the cornering, therefore, large traction can be secured and the handling stability is improved. Further, in comparison with the middle parts Mi, the rigidity is decreased in the central part Cr and the shoulder parts Sh, therefore, the vibrations caused during straight running can be effectively absorbed, and the riding comfort is improved. Furthermore, as the rigidity is decreased in the shoulder parts Sh, the contact of the tread portion with the ground is increased during cornering, and the handling stability can be improved.

Preferably, the winding pitch Pc of the strip 10 in the central part Cr is greater than the winding pitch Ps of the strip 10 in the shoulder parts Sh. Thereby, the rigidity of the shoulder parts Sh becomes higher than the rigidity of the central part Cr. Thus, when the shoulder part Sh is subjected to a larger load in the axial direction, namely, during cornering, larger traction can be ensured. Therefore, more excellent handling stability is exhibited, while improving the riding comfort during straight running.

As described, in the present embodiment, depending on the magnitude of load acting on the respective parts Cr, Mi and Sh, the winding pitches P suitable for the respective parts Cr, Mi and Sh are adopted. Thereby, a traction suitable for the leaning of the motorcycle can be generated, and the vibrations caused during the running can be effectively absorbed. Thus, the handling stability and the riding comfort can be improved in a good balance.

In order to effectively derive the effects described above, a ratio P/La of the winding pitch P of the strip 10 to a distance La between the outermost points 11a and 11b of the respective outermost reinforcing cords 11e and 11i in the strip 10 in the widthwise direction of the strip as shown in FIG. 2, (referred to as the pitch ratio P/La) is preferably set as follows:
the pitch ratio Pc/La of the winding pitch Pc in the central part Cr is preferably 162% to 260%;
the pitch ratio Pm/La of the winding pitch Pm in the middle parts Mi is preferably 129% to 162%; and
the pitch ratio Ps/La of the winding pitch Ps in the shoulder parts Sh is preferably 140% to 240%.

Further, the width we of the central part Cr measured along the tread face 2a is preferably 10% to 52%, more preferably 15% to 35% of the width Wa of the tread reinforcing layer 7 measured along the tread face;
the width Wm of each of the middle parts Mi measured along the tread face 2a is preferably 17% to 38%, more preferably 25% to 35% of the width Wa of the tread reinforcing layer 7; and the width Ws of each of the shoulder parts Sh measured along the tread face 2a is preferably 7% to 28%, more preferably 10% to 15% of the width Wa of the tread reinforcing layer 7.

The distance La between the outermost reinforcing cords 11e and 11i in the strip 10 is preferably set in a range from 2 to 8.2 mm. If the distance La is more than 8.2 mm, the difference between the winding diameters of the axially innermost and outermost reinforcing cords 11 in the strip 10 is increased, and the reinforcing cords 11 in the strip 10 may have excessively large differences in the cord tension. If the distance La is less than 2 mm, the number of winding the strip 10 is increased, and there is a possibility that the productivity of forming the tread reinforcing layer 7 is deteriorated.

Preferably, the number of the reinforcing cords 11 in the strip 10 is set in a range from 2 to 7.

When the number of the reinforcing cords 11 in the strip 10 is 3 or more, it is preferable that the arrangement pitch of the cords is constant.

If the number of the reinforcing cords 11 is 8 or more, the difference between the winding diameters of the axially innermost and outermost reinforcing cords 11 in the strip 10 is increased, and there is a possibility that the rigidity distribution of the strip 10 is pulsatively varied in the widthwise direction thereof or in the tire axial direction. If the number of the reinforcing cords 11 is 1, it may take a long time to form the tread reinforcing layer 7.

Preferably, each of the reinforcing cords 11 has an initial elongation percentage (a) in a range from 0.2% to 1.0%.

Here, the initial elongation percentage is a difference between an elongation at a load of 2.5N and an elongation at a load of 49N of the cord, more specifically, an elongation of the cord in terms of a percentage when a load applied to the cord is increased from 2.5N to 49N.

If the initial elongation percentage (a) is less than 0.2%, the absorption of vibrations caused during running is likely to reduce, and the riding comfort is deteriorated. If the initial elongation percentage (a) exceeds 1.0%, the rigidity of the tread reinforcing layer 7 becomes excessively low, therefore, there is a possibility that the traction is decreased and the handling stability is deteriorated.

As to the reinforcing cords 11, for example, steel cords, aramid fiber cords and the like can be suitably used.

In the present embodiment, the tread reinforcing layer 7 is made up of a first halved reinforcing layer 7A disposed on one side (left side in FIG. 1) of the tire equator C and formed by winding a first strip 10A, and a second halved reinforcing layer 7B disposed on the other side (right side in FIG. 1) of the tire equator C and formed by winding a second strip 10B.

Thus, the strip 10 includes the first strip 10A and the second strip 10B.

In the present embodiment, as shown in FIG. 3, each of the strips 10A and 10B comprises three reinforcing cords 11: a first reinforcing cord 11A, a second reinforcing cord 11B and a third reinforcing cord 11C.

In the tread reinforcing layer 7, the first reinforcing cord 11A is axially innermost, the second reinforcing cord 11B is axially outermost and the third reinforcing cord 11c is disposed therebetween.

It is preferable that the initial elongation percentage a2 of the axially outside second reinforcing cord 11B is greater than the initial elongation percentage a1 of the axially inside first reinforcing cord 11A.

The tread portion 2 of the motorcycle tire 1 has a profile curved convexly toward the radially outside, therefore, in the strip 10, the winding diameter of the axially outside second reinforcing cord 11B becomes smaller than the winding diameter of the axially inside first reinforcing cord 11A.

By setting the initial elongation percentage a2 of the axially outside second reinforcing cord 11B to be greater than the initial elongation percentage a1 of the axially inside first reinforcing cord 11A, the tension of the axially inside first reinforcing cord 11A is increased more than the tension of the axially outside second reinforcing cord 11B.

Thus, the tread reinforcing layer 7 can provide necessary rigidity by the axially inside first reinforcing cords 11A. At the same time, by the axially outside second reinforcing cords 11A arranged alternately with the axially inside first reinforcing cords 11A, the tread reinforcing layer 7 is provided with flexibility which enables to absorb vibrations during running. Therefore, it is possible to improve the handling stability and riding comfort in a well-balanced manner.

In order to effectively derive the effects described above, it is preferred that the initial elongation percentage a1 of the axially inside first reinforcing cord 11A is in a range from 50% to 90% of the initial elongation percentage a2 of the axially outside second reinforcing cord 11B.

If the strip 10 include at least one reinforcing cord between the axially inside first reinforcing cord 11A and the axially outside second reinforcing cord 11B as in this example, the initial elongation percentage of the in-between reinforcing cord may be the same as that of either the first reinforcing cord 11A or the second reinforcing cord 11B.

But, it is preferable that the initial elongation percentages (a) of the reinforcing cords 11 in the strip 10 are gradually decreased from the axially outermost reinforcing cord 11B to the axially innermost reinforcing cord 11A.

Furthermore, it is preferred that the difference (a3−a1) in the initial elongation percentage between the third reinforcing cord 11C and the axially inside first reinforcing cord 11A is smaller than the difference (a2−a3) in the initial elongation percentage between the axially outside second reinforcing cord 11B and the third reinforcing cord 11C because the inclination angle with respect to the tire axial direction, of the profile of the tread reinforcing layer 7 becomes larger toward the tread edge 2t than the tire equator C due to the curvature, therefore,
the difference in the winding diameter between the axially outside second reinforcing cord 11B and the third reinforcing cord 11c is larger than the difference in the winding diameter between the third reinforcing cord 11c and the axially inside first reinforcing cords 11A.

The developed axial width Wa of the tread reinforcing layer 7 is preferably not less than 75%, more preferably not less than 80% of the developed tread width Twe in order that the tread reinforcing layer 7 effectively exerts its hooping effect to the carcass 6 in order to improve the handling stability.

Figure 4:
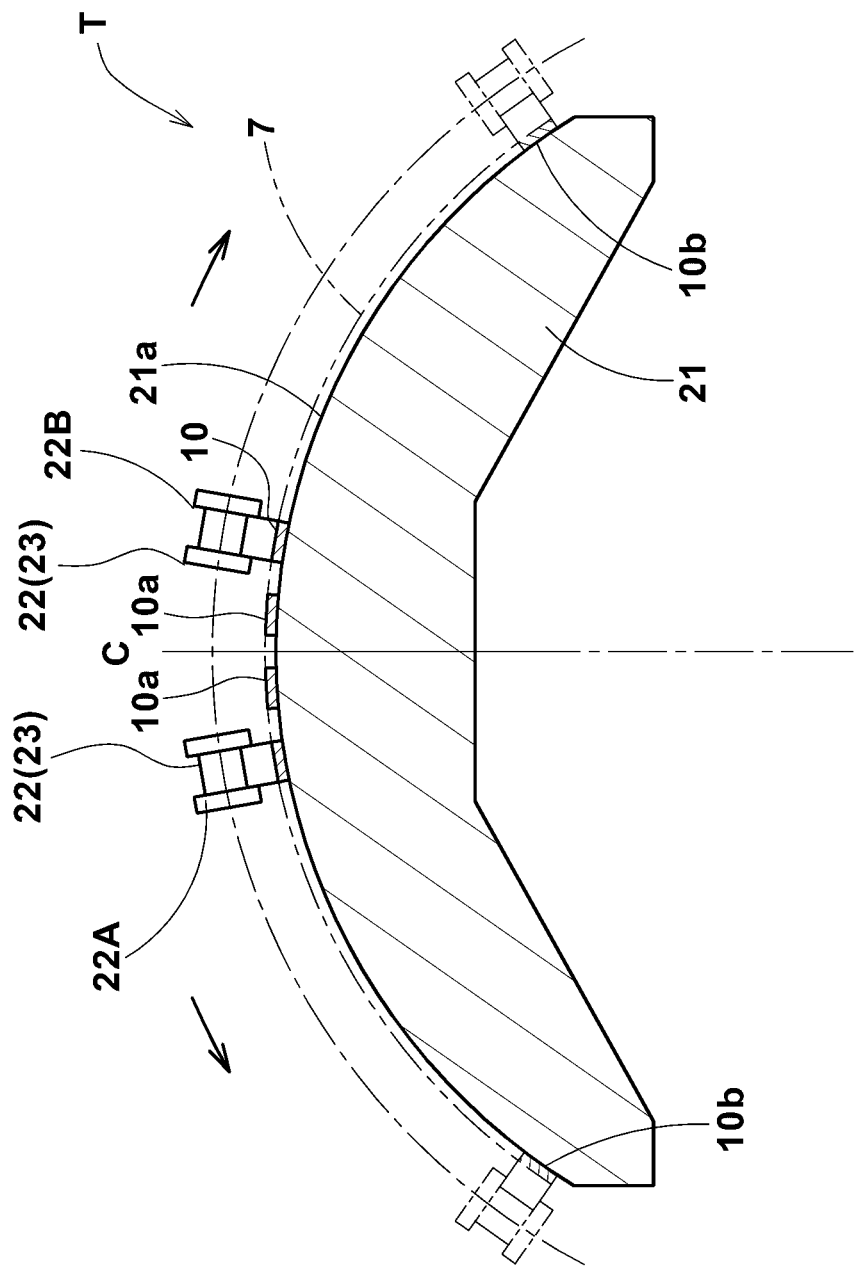
FIG. 4 is a schematic cross-sectional view for explaining a method for manufacturing the tread reinforcing layer in the present embodiment.

FIG. 4 shows an example of a method for manufacturing the tread reinforcing layer 7 of the tire 1 in the present embodiment. In this example, a manufacturing apparatus T is used.

The manufacturing apparatus T comprises a drum 21 and applicators 22 as schematic shown in FIG. 4.

The outer peripheral surface of the drum 21 is provided with a profiled shaping surface 21a on which the strips 10 are wound. The profiled shaping surface 21a is convexly curved according to the profile of the tread reinforcing layer 7 to be formed.

The applicators 22 feed the strips 10 with the shaping surface 21a of the drum 21.

The drum 21 has a spindle rotatably supported by a main frame (not shown) equipped with a drive unit for rotating the drum 21.

The applicator 22 in this example is a belt conveyer provided at the downstream end with a feed roller 23.

On the upstream side of the applicator 22, a rubber extruder (not shown) for extruding the strip 10 is provided so that the strip 10 is continuously supplied to the applicator 22.

The applicator 22 is movably supported by a moving device (not shown) so that the applicator 22 in particular the feed roller 23 can move in the axial direction and radially direction of the drum 21.

Thus, the feed roller 23 traverse the shaping surface 21a, while rotating the drum so that the strip 10 is wound helically and circumferentially on the drum 21.

In this example, the applicators 22 are a first applicator 22A for the first halved reinforcing layer 7A and a second applicator 22B for the second halved reinforcing layer 7B.

The process for forming the tread reinforcing layer 7 in the present embodiment is as follows:

First, the applicators 22A and 22B are set on both sides of the center plane of the drum 21 corresponding to the tire equator C and near the center plane.

More specifically, the first applicator 22A for forming the first halved reinforcing layer 7A is set on one side (left side in FIG. 4) of the center plane (C). The second applicator 22B for forming the second halved reinforcing layer 7B is set on the other side (right side in FIG. 4) of the center plane (C).

At this time, in order that the feed rollers 23 of the applicators 22A and 22B does not contact with each other, the feed rollers 23 may be set at different positions in the circumferential direction of the drum, and/or
the winding start time of the applicator 22A and the winding start time of the applicator 22B may be delayed one from the other.

Next, the start ends 10a of the first and second strips 10A and 10B fed by the applicators 22A and 22B are pressed against and adhered to the shaping surface 21a at positions adjacent to and on both sides of the center plane (C), for example, by the use of pressure rollers (not shown).

At this time, the axially inside first reinforcing cord 11A in the first strip 10A and the axially inside first reinforcing cord 11A in the second strip 10B are positioned adjacently to each other in the axial direction on both sides of the center plane (C).

Then, while rotating the drum 21, the applicators 22A and 22B are moved toward the respective axial outer sides. At this time, a controller (not shown) controls the traversing speed of each applicator, the feed rate of each strip 10 and the rotational speed of the drum 21 to achieve the above-mentioned winding pitches Pc, Pm and Ps in the respective parts Cr, Mi and Sh.

When the first and second strips 10A and 10B have been wound predetermined turns, the strips 10A and 10B are cut, and the cut ends 10b are fixed to the positions of the axially outer ends of the tread reinforcing layer 7. Thus, the tread reinforcing layer 7 consisting of the first halved reinforcing layer 7A and the second halved reinforcing layer 7B is formed.

While detailed description has been made of a preferable embodiment of the present invention, the present invention can be embodied in various forms without being limited to the illustrated embodiment.

Comparison Test

Motorcycle tires of size 190/50ZR17 having the specifications shown in Table 1 were manufactured as test tires, and tested for the handling stability and riding comfort.

The test tires were working examples (Ex.1-Ex.29) and Comparative examples (Ref.1-Ref.3) manufactured based on the structure shown in FIG. 1, and Conventional example (Cony). Common specifications are as follows:

Developed width Wa of Tread reinforcing layer Wa/Developed tread width Twe: 84%

Number of Reinforcing cords in Each strip: 3

Reinforcing cords: steel cords

Distance La between Reinforcing cords: 3.3 mm

Initial elongation percentage of First reinforcing cord: 0.8%

<Handling Stability and Riding Comfort Test>

Each test tire (inflated to 290 kPa) was mounted on the rear wheel (size 18×MT6.00) of a 1300 cc motorcycle, and was run on a dry asphalt road of a test course.

During running, the test rider evaluated the handling stability based on handle response and cornering characteristics regarding traction and grip, as well as the riding comfort based on absorption of vibrations.

The results are indicated in Table 1 by an index based on Conventional example (Cony) being 100, wherein the larger value is better.

For all the test tires (rear tires), an identical tire of size 120/70R17 having a conventional structure was used as the front tire.

TABLE 1

| Tire | Conv | Ref.1 | Ref.2 | Ref.3 | Ex.1 | Ex.2 | Ex.3 | Ex.4 | Ex.5 | Ex.6 |
|---|---|---|---|---|---|---|---|---|---|---|
| Pc/La(%) | 129 | 160 | 190 | 120 | 190 | 150 | 170 | 260 | 280 | 190 |
| Pm/La(%) | 129 | 180 | 140 | 140 | 140 | 140 | 140 | 140 | 140 | 110 |
| Ps/La(%) | 129 | 155 | 120 | 175 | 175 | 145 | 165 | 175 | 175 | 175 |
| Wc/Wa(%) | — | 15 | 15 | 15 | 15 | 15 | 15 | 15 | 15 | 15 |
| Wm/Wa(%) | — | 32.5 | 32.5 | 32.5 | 32.5 | 32.5 | 32.5 | 32.5 | 32.5 | 32.5 |
| Ws/Wa(%) | — | 10 | 10 | 10 | 10 | 10 | 10 | 10 | 10 | 10 |
| a1/a2(%) | 100 | 75 | 75 | 75 | 75 | 75 | 75 | 75 | 75 | 75 |
| handling stability | 100 | 100 | 103 | 101 | 110 | 112 | 110 | 110 | 107 | 110 |
| riding comfort | 100 | 103 | 102 | 102 | 110 | 106 | 110 | 110 | 111 | 108 |

| Tire | Ex.7 | Ex.8 | Ex.9 | Ex.10 | Ex.11 | Ex.12 | Ex.13 | Ex.14 | Ex.15 | Ex.16 |
|---|---|---|---|---|---|---|---|---|---|---|
| Pc/La(%) | 190 | 190 | 190 | 190 | 190 | 250 | 260 | 190 | 190 | 190 |
| Pm/La(%) | 130 | 160 | 170 | 120 | 130 | 140 | 140 | 140 | 140 | 140 |
| Ps/La(%) | 175 | 175 | 175 | 130 | 140 | 240 | 250 | 175 | 175 | 175 |
| Wc/Wa(%) | 15 | 15 | 15 | 15 | 15 | 15 | 15 | 10 | 15 | 35 |
| Wm/Wa(%) | 32.5 | 32.5 | 32.5 | 32.5 | 32.5 | 32.5 | 32.5 | 38 | 35 | 25 |

TABLE 1-continued

| | | | | | | | | | | |
|---|---|---|---|---|---|---|---|---|---|---|
| Ws/Wa(%) | 10 | 10 | 10 | 10 | 10 | 10 | 10 | 7 | 7.5 | 7.5 |
| a1/a2(%) | 75 | 75 | 75 | 75 | 75 | 75 | 75 | 75 | 75 | 75 |
| handling stability | 110 | 110 | 107 | 113 | 110 | 110 | 106 | 112 | 110 | 107 |
| riding comfort | 110 | 110 | 111 | 105 | 110 | 110 | 112 | 105 | 110 | 111 |

| Tire | Ex.17 | Ex.22 | Ex.23 | Ex.24 | Ex.25 | Ex.26 | Ex.27 | Ex.28 | Ex.29 |
|---|---|---|---|---|---|---|---|---|---|
| Pc/La(%) | 190 | 190 | 190 | 190 | 190 | 190 | 190 | 190 | 190 |
| Pm/La(%) | 140 | 140 | 140 | 140 | 140 | 140 | 140 | 140 | 140 |
| Ps/La(%) | 175 | 175 | 175 | 175 | 175 | 175 | 175 | 175 | 175 |
| Wc/Wa(%) | 52 | 10 | 10 | 20 | 10 | 15 | 15 | 15 | 15 |
| Wm/Wa(%) | 17 | 38 | 35 | 25 | 17 | 32.5 | 32,5 | 32,5 | 32.5 |
| Ws/Wa(%) | 7 | 7 | 10 | 15 | 28 | 10 | 10 | 10 | 10 |
| a1/a2(%) | 75 | 75 | 75 | 75 | 75 | 45 | 50 | 90 | 100 |
| handling stability | 103 | 110 | 110 | 108 | 106 | 108 | 110 | 110 | 109 |
| riding comfort | 113 | 110 | 110 | 111 | 112 | 107 | 110 | 110 | 106 |

From the test results, it was confirmed that working example tires were improved in the riding comfort and handling stability in a good balance in comparison with Comparative example tires.

DESCRIPTION OF THE REFERENCE SIGNS 1 motorcycle tire
2 tread portion
3 sidewall portion
4 bead portion
5 bead core
6 carcass
7 tread reinforcing layer
10 strip
11 reinforcing cord
12 topping rubber
Cr central part
Mi middle part
Sh shoulder part

The invention claimed is:

1. A motorcycle tire comprising:
a tread portion having a tread face,
a pair of sidewall portions,
a pair of bead portions,
a carcass extending between the bead portions through the tread portion and the sidewall portions, and
a tread reinforcing layer disposed radially outside the carcass in the tread portion, and having a developed axial width (Wa) of not less than 75% of a developed tread width (TWe) between tread edges of the tread face, each measured along the tread face in a tire meridian section,
wherein
the tread reinforcing layer is made up of a first halved reinforcing layer disposed on one side of the tire equator, and a second halved reinforcing layer disposed on the other side of the tire equator,
the first halved reinforcing layer is composed of a helically-wound first strip of parallel reinforcing cords coated with topping rubber,
the second halved reinforcing layer is composed of a helically-wound second strip of parallel reinforcing cords coated with topping rubber,
the reinforcing cords of the first strip include an axially inside first reinforcing cord and an axially outside second reinforcing cord disposed axially outside the axially inside first reinforcing cord,
the reinforcing cords of the second strip include an axially inside first reinforcing cord and an axially outside second reinforcing cord disposed axially outside the axially inside first reinforcing cord,
in each of the first strip and the second strip, an initial elongation percentage a2 of the axially outside second reinforcing cord is greater than an initial elongation percentage a1 of the axially inside first reinforcing cord, wherein the initial elongation percentage of a reinforcing cord is an elongation of the cord in terms of a percentage when a load applied to the cord is increased from 2.5N to 49N,
the first strip and second strip are helically wound from the tire equator to the respective edges of the tread reinforcing layer,
in each of the first halved reinforcing layer and the second halved reinforcing layer, the first reinforcing cord and the second reinforcing cord are alternately arranged from the tire equator to the respective edges of the tread reinforcing layer, and
the winding pitch P of the helically-wound first and second strips is larger in a central part and axially outer shoulder parts of the tread reinforcing layer than in middle parts of the tread reinforcing layer between the central part and the shoulder parts.

2. The motorcycle tire according to claim 1, wherein the winding pitch P is larger in the central part than in the axially outer shoulder parts.

3. The motorcycle tire according to claim 1, wherein
a pitch ratio P/La of the winding pitch P to a distance La between the reinforcing cords in each strip which are closest to respective two sides of the strip is
162% to 260% in the central part,
129% to 162% in the middle parts, and
140% to 240% in the shoulder parts.

4. The motorcycle tire according to claim 3, wherein said distance La between the reinforcing cords is in a range from 2.0 to 8.2 mm.

5. The motorcycle tire according to claim 1, wherein
a width of the central part measured along the tread face is 10% to 52% of a tread reinforcing layer width which is a width of the tread reinforcing layer measure along the tread face,
a width of each of the middle parts measured along the tread face is 17% to 38% of the tread reinforcing layer width, and
a width of each of the shoulder parts measured along the tread face is 7% to 28% of the tread reinforcing layer width.

6. The motorcycle tire according to claim 1, wherein the initial elongation percentage a1 of the axially inside first reinforcing cord is in a range from 50% to 90% of the initial elongation percentage a2 of the axially outside second reinforcing cord.

7. The motorcycle tire according to claim 1, wherein
each of the first strip and the second strip includes at least one reinforcing cord between the axially inside first reinforcing cord and the axially outside second reinforcing cord, and
the initial elongation percentages of the reinforcing cords in each strip are gradually decreased from the axially outermost reinforcing cord to the axially innermost reinforcing cord.

8. The motorcycle tire according to claim 1, wherein
each of the first strip and the second strip includes an additional reinforcing cord between the axially inside first reinforcing cord and the axially outside second reinforcing cord, and
the initial elongation percentages of the additional reinforcing cord is the same as the initial elongation percentage a1 of the axially inside first reinforcing cord.

9. The motorcycle tire according to claim 1, wherein
each of the first strip and the second strip includes an additional reinforcing cord between the axially inside first reinforcing cord and the axially outside second reinforcing cord, and
the initial elongation percentages of the additional reinforcing cord is the same as the initial elongation percentage a2 of the axially outside second reinforcing cord.

* * * * *